United States Patent Office

3,045,001
Patented July 17, 1962

3,045,001
POLYMERIZATION PROCESS
Richard S. Berger, Richmond, Calif., assignor to Shell Oil Company, a corporation of Delaware
No Drawing. Filed Mar. 24, 1958, Ser. No. 723,097
10 Claims. (Cl. 260—93.5)

This invention relates to a new polymerization process. More particularly, the invention relates to a new process for polymerization ethylenically unsaturated compounds using a special type of catalyst.

Specifically, the invention provides a new and improved process for polymerizing alpha, beta-ethylenically unsaturated hydrocarbons or halo-substituted hydrocarbons at low pressures to form high molecular weight polymers. This process comprises contacting the ethylenically unsaturated monomer with an addition product of a transition metal halide and a compound possessing at least one electronegative group, such as, for example, a complex of titanium tetrachloride and nitrobenzene, in combination with an organo metallic catalyst in an inert atmosphere and substantially anhydrous conditions.

It is known that unsaturated hydrocarbons, such as propylene, can be polymerized by contact with a metal halide, such as titanium tetrachloride, in combination with a metal alkyl. The metal halides used in this technique, however, are generally quite volatile and this results in a loss of catalyst during handling as well as corrosion of equipment and the like. It would be highly desirable to obtain catalysts which were less volatile, but still possess high catalytic activity toward formation of high molecular weight linear type polymers from the above-noted monomers.

It is, therefore, an object of the invention to provide a new process for polymerizing alpha, beta-ethylenically unsaturated compounds. More particularly, the invention provides a new process for polymerizing the above monomers at low pressures to form high molecular weight linear polymers. It is a further object to provide a new process for polymerizing alpha, beta-ethylenically unsaturated hydrocarbons to form high molecular weight polymers which utilizes less volatile metal catalysts and gives high yield of product. These and other objects of the invention will be apparent from the following detailed description thereof.

It has now been discovered that these and other objects may be accomplished by the process of the invention which comprises contacting the alpha, beta-ethylenically unsaturated hydrocarbons or halo-substituted hydrocarbons with an addition product of a transition metal halide and a compound possessing at least one electronegative group, such as, for example, a complex of titanium tetrachloride and nitrobenzene, in combination with an organo metallic catalyst, such as aluminum triethyl, in an inert atmosphere and substantially anhydrous conditions. It has been found that these special metal addition products have high catalytic activity towards the alpha, beta-ethylenically unsaturated hydrocarbons and readily convert the monomers at relatively low pressures and temperatures to high molecular weight linear polymers of great practical value. In addition, the new catalyst systems have low volatility and there is little danger of loss on handling or from corrosion during the process.

The monomers to be polymerized in the new process of the invention comprise the alpha, beta-ethylenically unsaturated hydrocarbons and their halo-substituted derivatives. This includes, for example, the monoolefins, diolefins, alkenyl-substituted aromatic hydrocarbons, and the like. Specific examples of such monomers include, among others, ethylene, propylene, isobutylene, amylenes, 1-dodecene, 1-tetradecene, 1-octadecene, 1-eicoscene, butadiene, isoprene, 1,3-dimethylbutadiene, chloroprene, piperylene, 1,5-dodecadiene, 1,4-octadiene, styrene, alpha-methylstyrene, vinylnaphthalene, o-methylstyrene, o-octylstyrene, o,p-dibutylstyrene, allylbenzene, cyclopentadiene, methylcyclopentadiene, and halogenated cyclopentadiene.

Preferred monomers to be employed in the process comprise the alpha-olefins and diolefins containing up to 8 carbon atoms and the alkenyl-substituted aromatic hydrocarbons containing 8 to 16 carbon atoms.

One of the catalysts used in the process of the invention includes the aforementioned addition products of the transition metal halides and organic compounds possessing at least one electronegative group. The transition metals may be exemplified by titanium, vanadium, zirconium, tantalum, chromium, molybdenum, cobalt, and columbium. The halides may be selected from any of the chlorides, bromides, fluorides, or iodides with the first two being more preferred. Examples of the transition metal halides include, among others, titanium pentachloride, vanadium tribromide, titanium tetrachloride, titanium tetrafluoride, zirconium tribromide, zirconium trichloride, tantalum trichloride, chromium trichloride, molybdenum trichloride and the like. Especially preferred are the chlorides and bromides of metals of groups IVB to VIB of the periodic table of elements.

The compounds having at least one electronegative group which are used in preparing addition products with the above-described halides include compounds, such as, for example, those organic compounds having at least one nitro, ester, nitrile, ether, sulfide, keto group, or the like. The organic compound substituted with such groups may be aliphatic, cycloaliphatic, aromatic, or heterocyclic and may be saturated or unsaturated. Examples of these compounds having the electronegative group include, among others, nitrogen-containing compounds as nitrobenzene, dinitrobenzene, nitrocyclohexene, trinitrobenzene, benzoyl chloride, diethyl fumarate, diallyl fumarate, dibutyl maleate, diethyl malonate, butyl oxalate, dihexyl phthalate, dioctyl phthalate, diallyl succinate, benzonitrile, acrylonitrile, methacrylonitrile, adiponitrile, 1,4-dicyanocyclohexane, dibutyl sulfide, diallyl sulfide, dicyclohexylsulfide, dibutyl ether, dioctyl ether, dicyclohexyl ether, phenyl butyl ether, benzophenone, and the like.

Particularly preferred compounds containing the electronegative group to be used in preparing the addition products include the aliphatic, cycloaliphatic and aromatic hydrocarbons substituted with from 1 to 2 members of the group consisting of nitro, ester, nitrile, sulfide, and keto, ether, acyl groups, and particularly those possessing not more than 20 carbon atoms and especially those containing from 2 to 12 carbon atoms. Preferred esters are the alkyl and alkenyl esters of the saturated and unsaturated polybasic acids.

The addition products are formed by merely mixing the transition metal halide and the compound possessing the electro-negative group together in approximately equal molecular proportions in the substantial absence of water. It is generally not necessary to apply heat to the reaction as the formation of the complex is generally exothermic and supplies sufficient heat to effect the rapid formation of the complex. Cooling may be desired in some cases to control the reaction. On formation, the addition products crystallize out as a fine, light yellow solid.

The addition products formed from the nitro, cyano and ester substituted hydrocarbons described hereinabove are particularly desirable as they form crystalline solids which are isolatable and stable and can be stored as such away from moisture for long periods before being utilized.

In all cases, it is desirable to keep the addition products dry and away from the air until utilized in the polymerization reaction.

The preparation of several of the addition products from titanium tetrachloride is illustrated below:

*Titanium tetrachloride-nitrobenzene addition product.—* In a closed reaction vessel free of moisture, are added 1 mole of titanium tetrachloride and approximately 1 mole of purified nitrobenzene. The mixture begins to warm up and solidifies to a yellow solid. The solid is collected and the crystals stored in a dry closed vessel. The addition product had a melting point of 80–81° C.

*Titanium tetrachloride-benzonitrile addition product.—* 10.0 g. of titanium tetrachloride and 3.7 g. of benzonitrile are added to the closed dry reaction vessel described above. The mixture is stirred and in a short period warms and solidifies. The solid is collected and the crystals stored in a dry closed vessel. The addition product had a melting point of 172° C.

*Titanium tetrachloride-diethyl fumarate addition product.—* 10 g. of titanium tetrachloride in 10 ml. benzene and 5.9 g. of diethyl fumarate in 5 ml. benzene are added to the closed dry reaction vessel described above. The mixture is stirred and in a short period begins to warm up and precipitation of a yellow solid occurs. The solid is collected and the crystals stored in a dry closed vessel.

In the polymerization, the above-described addition products are utilized in combination with one or more organo metallic co-catalysts. These co-catalysts may be any of the compounds having an organo radical, and preferably an alkyl radical, attached directly to metals, such as, for example, aluminum alkyls, lithium alkyls, zirconium alkyls, cobalt alkyls, and the like. Especially preferred are the aluminum trialkyls, such as aluminum tributyl, aluminum triethyl, aluminum triisobutyl, aluminum triisopropyl and aluminum triamyl. Especially preferred are those having alkyl groups containing from 1 to 8 and particularly 1 to 6 carbon atoms.

The above-described addition products and the organo metals are combined in the polymerization so as to have the metal in the organo metal compound and the metal in the metal halide portion of the addition product in a ratio of about 1:1 to 10:1. Preferably, the catalysts are utilized so as to have the metal in the organo metallic and the metal in the metal halide portion of the addition product vary in a mol ratio of 2:1 to 8:1.

The polymerization is accomplished by contacting the monomer to be polymerized with the above-described addition product and the organo metallic compound in an inert atmosphere and under substantially anhydrous conditions. The addition product and the organo metal compound may be added to the reaction mixture together, separately, or they may be premixed before being added to the reaction mixture. The monomer and catalyst may be brought into contact merely by mixing and stirring.

The amount of the addition product to be employed in the reaction will vary depending upon the rate of formation of polymer desired. Thus, for example, if a slow rate of formation is desired, one should use a small amount of catalyst, and if one desired a fast rate, larger amounts of catalyst should be employed. Preferred amounts of the addition product vary from about .1% to 5% by weight of the monomer being polymerized.

The polymerization is preferably accomplished at low temperatures and low pressures. Temperatures ranging from 0° C. or below to 100° C. or slightly higher are particularly preferred. The polymerization of propoylene, for example, is preferably accomplished at a temperature ranging from about 40° C. to 70° C.

Preferred presures range from about atmospheric pressure up to 1000 p.s.i. Satisfactory rates are obtained by using pressures ranging from about 50 p.s.i.g. to 200 p.s.i.g.

The polymerization may be conducted in the presence or absence of solvents or diluents. Solvents are preferred as the catalysts display greater activity therein and it is usually easier to remove the product from the reaction vessel. Preferred solvents are the inert hydrocarbons, such as octane, isooctane, n-heptane, xylene, benzene and the like. The solvent is usually employed so as to form rather dilute solutions, e.g., 10–20% solutions of the monomer.

As noted above, the polymerization process is conducted in an inert atmosphere. This is preferably accomplished by first sweeping out the reaction zone with an inert gas. Suitable inert materials include nitrogen, methane, and the like.

The process should also be conducted under substantially anhydrous conditions. This is accomplished by using anhydrous reactants and dry reaction vessels and maintaining customary precautions during the reaction to keep water out of the reaction vessel.

After the completion of the polymerization reaction, the catalyst and solvent are removed from the polymer. This is preferably accomplished by adding an alcohol, such as isopropyl alcohol or ethanol, which may be acidified, to the reaction mixture. This causes precipitation of the polymer and the catalyst (which enters reaction with the alcohol) is removed in the alcoholic fraction. The polymer may then be removed by filtration, centrifugation, and the like and subsequently further washed and purified.

The polymers formed by the process of the invention will be linear high molecular weight polymers. The products will preferably have molecular weights ranging from about 50,000 to 1,000,000 as determined by the light scattering technique as described Chem. Rev., volume 40, page 319 (1949).

The high molecular weight products of the invention may be used for a great variety of important industrial applications. They may be molded under conventional conditions, for example, to form attractive molded articles, such as toys, parts for appliances, containers, and the like. Some of the higher molecular weight products may also be utilized in the formation of fibers and in the preparation of surfacing and impregnating compositions.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts described in the examples are parts by weight.

*Example I*

This example illustrates the use of an addition product of titanium tetrachloride and nitrobenzene in the polymerization of propylene.

A 250 ml. glass reaction vessel was flushed with nitrogen. To this was added 100 milliliters of anhydrous heptane, 4.86 millimoles of the titanium tetrachloride-nitrobenzene addition product prepared as shown above, and 4.86 millimoles of aluminum triethyl. The mixture was then heated for 2 hours at 85° C. 19.44 more millimoles of aluminum triethyl were then added so as to give a ratio of aluminum to titanium of 5:1.

12 grams of propylene was then introduced into the reactor and the contents agitated. The reactor was maintained at 50° C. for 66 hours. Isopropanol was then added to the mixture to precipitate the polymer. The mixture was filtered and the polymer precipitate boiled with 2% hydrochloric acid in isopropyl alcohol and then dried. The resulting product was a white solid which had a linear structure and an intrinsic viscosity of 3.6. The product could be heat molded at 215° C. to form attractive plastic articles.

The above process was repeated with the exception that all of the aluminum triethyl was added at the beginning with the complex. Related results are obtained.

Example II

This example illustrates the use of an addition product of titanium tetrachloride and benzonitrile in the polymerization of propylene.

A 250 ml. glass reactor was flushed with nitrogen. To this was added 100 milliliters of anhydrous heptane, 2.05 millimoles of the titanium tetrachloride-benzonitrile addition product produced as shown above, and 2.05 millimoles of aluminum triethyl. The mixture was then heated for 2 hours at 80–85° C. 8.20 more millimoles of aluminum triethyl were then added.

21.0 parts of propylene was introduced into the reactor and the mixture maintained with stirring at 50° C. for 71 hours. Isopropanol was then added to the mixture to precipitate the polymer. The mixture was filtered and the polymer boiled with 2% hydrochloric acid in isopropyl alcohol. The resulting dried product was a white solid having a linear structure. The polymer had an intrinsic viscosity of 5.2. The product could be heat molded at 215° C. to form attractive plastic articles.

Related results are obtained by replacing the aluminum triethyl in the above process with equivalent amounts of each of the following: aluminum triamyl, aluminum tributyl, aluminum triisopropyl, and butyl lithium.

Example III

This example illustrates the use of an addition product of titanium tetrachloride and diethyl fumarate in the polymerization of propylene.

A 250 ml. glass reactor was flushed with nitrogen. To this was added 70 milliliters of anhydrous heptane, 1.33 millimoles of an addition product of titanium tetrachloride and diethylfumarate produced as shown above, and 1.33 millimoles of aluminum triethyl. The mixture was then heated for 2 hours at 80–85° C. 5.32 millimoles more of the aluminum triethyl was added.

12 parts of propylene was then introduced into the reaction zone at a pressure of 90 p.s.i.g. This mixture was maintained with stirring for 71 hours at 50° C. Isopropanol was then added to the mixture to precipitate the polymer. The mixture was filtered and the polymer boiled with 2% hydrochloric acid in isopropyl alcohol. The resulting product when dried was a white solid. The polymer had an intrinsic viscosity of 2.8. The product could be heat molded at 215° C. to form attractive plastic articles.

Example IV

Examples I to III are repeated with the exception that 1-butene is used in place of the propylene. Polymers having related properties are obtained.

Example V

This example illustrates the use of an addition product of titanium tetrachloride and nitrobenzene in the polymerization of butadiene.

To the vessel described in Example III is added 100 milliliters of the anhydrous heptane, 2.05 millimoles of the titanium tetrachloride-nitrobenzene addition product produced as shown above, and 10.25 millimoles of aluminum tributyl. This mixture is then heated at 40° C. 20 parts of butadiene is then introduced and the temperature maintained at 40–50° C. for several hours. The polymer was then precipitated, washed and dried. The resulting product is a solid having a relatively high molecular weight which could be vulcanized with sulfur to form a hard rubber.

Example VI

Examples I to III are repeated with the exception that ethylene is used in place of propylene. Polymers having related properties are obtained.

Example VII

Examples I to III are repeated with the exception that styrene is used in place of propylene to produce polystyrene.

I claim as my invention:

1. A process for polymerizing alpha, beta-ethylenically unsaturated hydrocarbons containing up to 8 carbon atoms which comprises contacting the compound with (1) .1% to 5% by weight of a preformed solid addition product of a titanium halide and a hydrocarbon substitute with at least one nitro group, and (2) an aluminum alkyl wherein the alkyl radical contains up to 8 carbon atoms, the aluminum in the aluminum alkyl and the metal in the transition metal halide portion of the addition product being present in a ratio of about 1:1 to 10:1, and maintaining the mixture in an inert atmosphere and anhydrous conditions and at a temperature between 0° C. and 100° C. and a pressure up to 1000 p.s.i. until the unsaturated hydrocarbon has been polymerized.

2. A process for polymerizing alpha-olefins containing up to 8 carbon atoms which comprises adding to the alpha-olefin (1) from .1% to 5% by weight of a solid preformed addition product of a titanium halide and a nitro-substituted aromatic hydrocarbon and (2) an aluminum alkyl compound wherein the alkyl radical contains up to 8 carbon atoms, the aluminum in the aluminum alkyl and the titanium in the titanium halide being present in a ratio of about 1:1 to 10:1, and maintaining the mixture in an inert atmosphere and anhydrous conditions at a temperature between 0. C. and 100° C. and a pressure up to 100 p.s.i. until the alpha-olefin has been polymerized.

3. A process as in claim 1 wherein the unsaturated hydrocarbon is propylene.

4. A process as in claim 1 wherein the unsaturated hydrocarbon is ethylene.

5. A process as in claim 1 wherein the unsaturated hydrocarbon is butadiene.

6. A process as in claim 1 wherein the unsaturated hydrocarbon is 1-butene.

7. A process as in claim 1 wherein the addition product is one of a titanium halide and a hydrocarbon substituted with at least one nitro group.

8. A process as in claim 1 wherein the unsaturated hydrocarbon is styrene.

9. A process for preparing a polymer of propylene which comprises contacting the propylene in an inert atmosphere and anhydrous conditions with 0.1% to 5% by weight of a solid preformed addition product of titanium tetrachloride and a nitro-substituted hydrocarbon, and (2) aluminum trialkyl wherein the alkyl groups contain up to 8 carbon atoms, the aluminum in the aluminum alkyl and the titanium in the titanium tetrachloride being present in a ratio of about 1:1 to 10:1.

10. A process as in claim 9 wherein the addition product is a titanium tetrachloride-nitrobenzene addition product.

References Cited in the file of this patent

UNITED STATES PATENTS

| | | |
|---|---|---|
| 2,881,156 | Pilar et al. | Apr. 7, 1959 |
| 2,930,807 | Case | Mar. 29, 1960 |
| 2,940,964 | Mostardini et al. | June 14, 1960 |

FOREIGN PATENTS

| | | |
|---|---|---|
| 533,362 | Belgium | May 16, 1955 |
| 26,899/57 | Australia | Apr. 9, 1957 |